US010891675B2

(12) United States Patent
De Haas et al.

(10) Patent No.: US 10,891,675 B2
(45) Date of Patent: Jan. 12, 2021

(54) SYSTEM AND METHOD OF PROVIDING NOTIFICATION TO A CUSTOMER USING AN ELECTRONIC SHELF LABEL SYSTEM

(71) Applicant: Opticon Sensors Europe B.V., Hoofddorp (NL)

(72) Inventors: Dick De Haas, Hoofddorp (NL); Naohide Kamio, Hoofddorp (NL)

(73) Assignee: Opticon Sensors Europe B.V., Hoofddorp (NL)

( * ) Notice: Subject to any disclaimer, the term of this patent is extended or adjusted under 35 U.S.C. 154(b) by 223 days.

(21) Appl. No.: 16/124,780

(22) Filed: Sep. 7, 2018

(65) Prior Publication Data

US 2020/0082454 A1 Mar. 12, 2020

(51) Int. Cl.
*G06Q 30/06* (2012.01)
*G06Q 20/20* (2012.01)
(Continued)

(52) U.S. Cl.
CPC ......... *G06Q 30/0627* (2013.01); *G06Q 20/20* (2013.01); *G06Q 20/341* (2013.01);
(Continued)

(58) Field of Classification Search
CPC ........... G06Q 30/0631; G06Q 30/0633; G06Q 30/0627; G06Q 30/06281; G06Q 20/20; G06Q 20/341
(Continued)

(56) References Cited

U.S. PATENT DOCUMENTS 8,403,215 B2   3/2013 Aihara et al.
8,429,026 B1   4/2013 Kolawa et al.
(Continued)

OTHER PUBLICATIONS

Article, "Identive's NFC Tags Selected by Store Electronic Systems for Innovative Retail Application NFC tags power electronic shelf labels to deliver product information directly to consumers' smartphones"; published Nasdaq OMX's News Release Distribution Channel [New York] Jun. 11, 2013; extracted from Google.*
(Continued)

*Primary Examiner* — Yogesh C Garg
(74) *Attorney, Agent, or Firm* — Kaplan Breyer Schwarz, LLP

(57) ABSTRACT

A system including an Electronic Shelf Label (ESL) system configured to communicate with a plurality of ESLs each corresponding to a product offered for sale. The system includes a Near Field Communication (NFC) device configured to communicate with each of the plurality of ESLs within a predetermined distance from the ESL, a customer profile database configured to store a plurality of customer profiles, wherein each of the plurality of customer profiles are associated with a customer NFC device, and a product database configured to store a plurality of product profiles for each of a plurality of products configured within the ESL system. The ESL system retrieves a customer profile associated with the NFC device, and a product profile associated with the product corresponding to an ESL in communication with the NFC device. The ESL system is configured to compare the customer profile with information in the product profile and configured to transmit a notification to a customer associated with the customer profile when information in the customer profile matches any information in the product profile.

22 Claims, 8 Drawing Sheets

(51) Int. Cl.
*G06Q 20/34* (2012.01)
*G06Q 30/02* (2012.01)

(52) U.S. Cl.
CPC ..... *G06Q 30/0281* (2013.01); *G06Q 30/0631* (2013.01); *G06Q 30/0633* (2013.01)

(58) Field of Classification Search
USPC ................ 705/26.63, 26.7, 26.8, 26.9, 26.61
See application file for complete search history.

(56) References Cited

U.S. PATENT DOCUMENTS

| | | |
|---|---|---|
| 8,905,305 B2 | 12/2014 | Crum |
| 9,053,510 B2 | 6/2015 | Crum |
| 9,721,446 B1 * | 8/2017 | Hanis ..................... G08B 21/18 |
| 9,911,138 B2 | 3/2018 | Grabovski et al. |
| 2010/0088149 A1 * | 4/2010 | Sullivan ................. G06Q 30/02 705/14.65 |
| 2012/0253828 A1 | 10/2012 | Bellacicco, Jr. |
| 2014/0214623 A1 | 7/2014 | Cancro et al. |
| 2016/0055562 A1 * | 2/2016 | Kim ........................ G09G 5/12 705/26.61 |
| 2017/0053096 A1 | 2/2017 | White et al. |

OTHER PUBLICATIONS

Authorized Officers: Mannheimer, Caroline and Tiago Pinheiro, International Search Report issued in counterpart PCT application No. PCT/IB2019/053432, dated Aug. 9, 2019, 12 pp.

* cited by examiner

SYSTEM AND METHOD OF PROVIDING NOTIFICATION TO A CUSTOMER USING AN ELECTRONIC SHELF LABEL SYSTEM

FIELD OF THE INVENTION

The present invention relates to an electronic shelf label (ESL) system that provides notification to a customer regarding ingredients, a composition of material or nutrition information of an item the customer may intend to buy before a customer purchases the item in a retail store environment.

BACKGROUND

Article information display systems may be used to electronically provide information about an associated product within a retail store environment. The system typically utilizes ESLs having a variable graphical display to electronically display information about the product. For example, information displayed may include price, price per unit weight, SKU codes and other product relevant information. Such a system may be used in retail supermarkets, drug stores, grocery stores, hardware stores, auto parts stores, or other settings where variable article information is desired to be displayed.

The article information display system reduces the labor that is required to update the information on the ESLs and diminishes the chances of displaying an incorrect price due to human error. Furthermore, the electronic article information display system facilitates the changing of a large number of prices at once, as all of the prices may be controlled and changed at a central computer or in the alternative, remotely at the position of the ESL with a near-field wireless communicator device.

However, there exists a problem of customers not knowing what consumable foods or non-consumable products may have ingredients or a composition of material(s) that they may be allergic to. Furthermore, there exists a problem of customers not knowing what consumable foods or non-consumable products may have ingredients or a composition of material(s) that they may not want to buy for special dietary, moral or religious reasons. Additionally, there exists a problem of customers not knowing what consumable foods products may have nutrition information that may conflict with their medical dietary restrictions or be beneficial to their health goals.

Therefore, a need exists to provide a convenient way for customers to be notified if consumable goods or non-consumable products contain ingredients or materials or have a certain nutritional value(s) would cause the consumer to avoid the product altogether, so as to prevent allergic reactions. Additionally, there exists to provide a convenient way for customers to be notified if consumable goods conform to a certain nutritional value(s) that would cause the consumer to purchase the product.

SUMMARY

It should be appreciated that the following Summary is provided to introduce a selection of concepts in a simplified form that are further described below in the Detailed Description. This Summary is not intended to be used to limit the scope of the claimed subject matter.

In a first embodiment disclosed herein, a system includes an ESL system configured to communicate with a plurality of ESLs each corresponding to a product offered for sale, a Near Field Communication (NFC) device configured to communicate with each of the plurality of ESLs within a predetermined distance from the ESL, a customer profile database configured to store a plurality of customer profiles, wherein each of the plurality of customer profiles are associated with a customer NFC device. and a product database configured to store a plurality of product profiles for each of a plurality of products configured within the ESL system.

The first embodiment further provides the NFC device being configured to communicate with one of the plurality of ESLs corresponding to a product offered for sale of the plurality of products when brought within the predetermined distance from the ESL. The first embodiment further provides the ESL system retrieving a customer profile associated with the NFC device from the customer profile database, and a product profile associated with the product offered for sale from the product database and corresponding to an ESL in communication with the NFC device. The first embodiment further provides the ESL system being configured to compare the customer profile with information in the product profile and configured to transmit a notification to a customer associated with the customer profile when information in the customer profile matches any information in the product profile.

In a second embodiment disclosed herein, a system includes an ESL system configured to communicate with a plurality of ESLs each corresponding to a product offered for sale, a NFC device configured to communicate with each of the plurality of ESLs within a predetermined distance from the ESL, a customer profile database configured to store a plurality of customer profiles, wherein each of the plurality of customer profiles are associated with a customer NFC device, a product database configured to store a plurality of product profiles for each of a plurality of products configured within the ESL system, and a Point of Sale (POS) device in communication with the ESL system configured to generate a shopping list of at least one product based on the NFC device interacting with at least one ESL of the plurality of ESLs.

The second embodiment further provides the NFC device being configured to communicate with one of the plurality of ESLs corresponding to a product offered for sale of the plurality of products when brought within the predetermined distance from the ESL. The second embodiment further provides the ESL system retrieves a customer profile associated with the NFC device from the customer profile database, and a product profile associated with the product offered for sale from the product database and corresponding to an ESL in communication with the NFC device. The second embodiment further provides the ESL system being configured to compare the customer profile with information in the product profile and configured to transmit a notification to a customer associated with the customer profile when information in the customer profile matches any information in the product profile. The second embodiment further provides the NFC device being configured to select a product associated with an ESL, and in response, the ELS system is configured to generate an electronic shopping list containing the product on the POS device.

In third embodiment disclosed herein, a method of providing notification to a customer about a product offered for sale includes providing an ESL system configured to communicate with a plurality of ESLs each corresponding to a product offered for sale, providing a product database configured to store a plurality of product profiles for each of a plurality of products configured within the ESL system, providing a customer profile database configured to store a plurality of customer profiles, wherein each of the plurality of customer profiles are associated with a customer NFC device, and selecting a product by bringing the NFC device within a communication range of an ESL.

The third embodiment further provides retrieving, based on selecting the product, a customer profile associated with the NFC device from the customer profile database and a product profile associated with the selected product from the product database corresponding to the ESL in the communication range with the NFC device, comparing the customer profile with information in the product profile, and based on comparing the customer profile with the information in the product profile, transmitting a notification to a customer associated with the customer profile.

BRIEF DESCRIPTION OF THE SEVERAL VIEWS OF THE DRAWINGS

The embodiments of the invention will be better understood from the following detailed description with reference to the drawings, which are not necessarily drawing to scale and in which.

DETAILED DESCRIPTION

Figure 1:
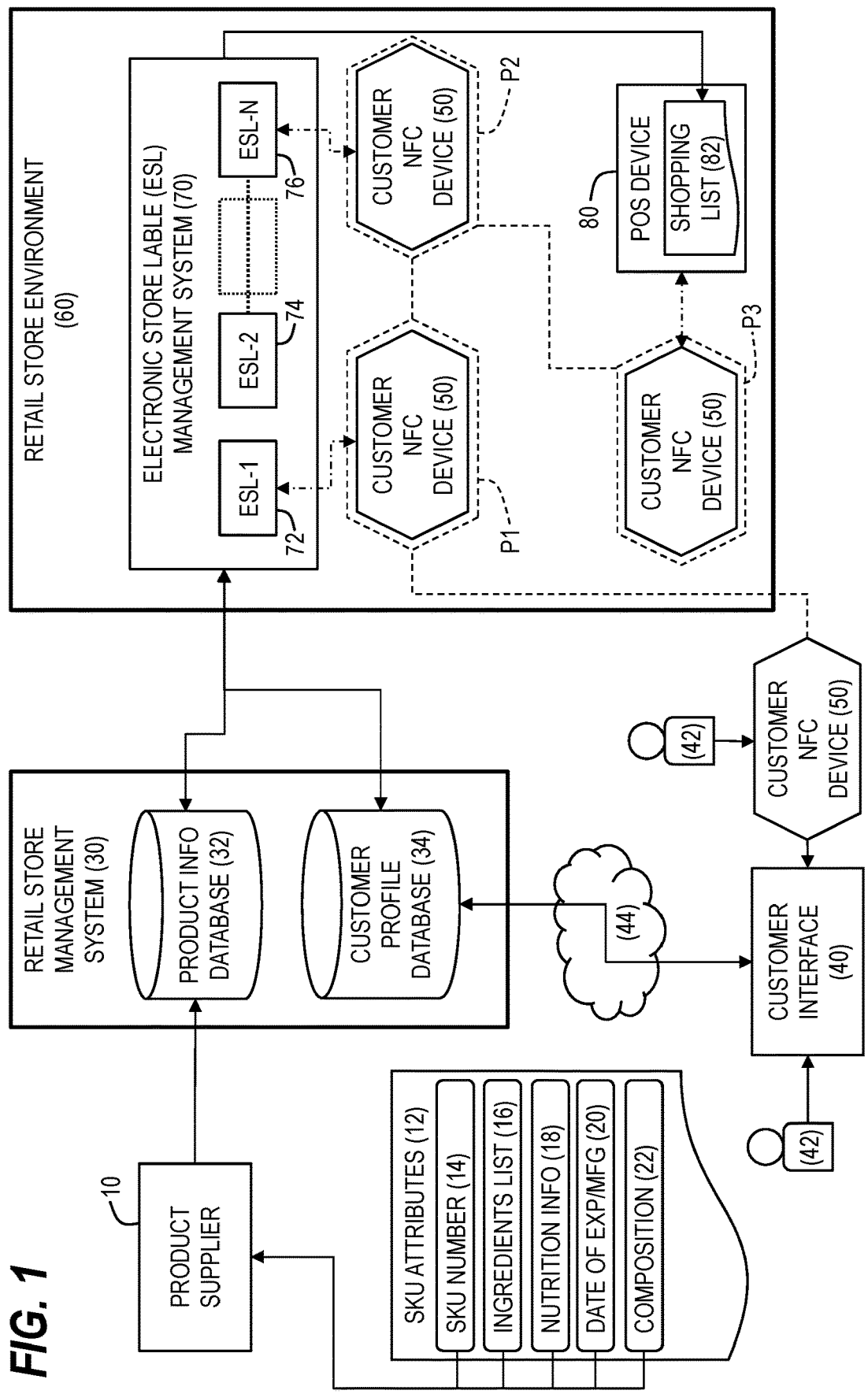
FIG. 1 illustrates a schematic diagram of a system that provides notification to a customer about a product that the customer intends to include on an electronic shopping list via interaction between a customer's NFC device and a retail store's ESL system.

FIG. 1 illustrates a schematic diagram of a system that provides notification to a customer about a product that the customer intends to include on an electronic shopping list via interaction between a customer's NFC device and a retail store's ESL system.

A first of two initial steps to implement the system and method of the embodiments described below is to generate of a product information database 32 for later management by a retail store management system 30 and access by an ESL management system 70. To generate the product information database 32, typically a product supplier 10, or wholesaler, may generate a Stock Keeping Unit (SKU) that describes a distinct type of item provided to the retailer for sale, and attributes associated with the item type to distinguish it from other item types. For retails products, these SKU attributes 12 typically include, but are not limited to, manufacturer, description, material, size, color, packaging, and warranty terms.

For the purposes of this disclosure, the product supplier 10 may provide for each distinct type of item carried by the retail store SKU attributes 12 including: a SKU number 14 that identifies the product; an ingredients list 16 for consumable goods that may be ingested by humans and/or animals; nutrition information 18 for consumable goods typically listing various types of nutrient information, (e.g., calories, fats, carbohydrates, etc.), by either serving size or a volume (e.g., 100 ml) or mass (e.g., 100 g) depending on the type of consumable; a date of expiration or date of manufacturing 20; and/or a composition of material(s) 22 for non-consumable items, (e.g., clothing having a blend of 80% wool and 20% elastane).

The second of the two initial steps to implement the system and method of the embodiments described below generates a customer profile database 34 for later management by the retail store management system 30 and access by the ESL management system 70. A customer profile may be generated by a customer 42 through a customer interface 40, for example, a web-application on a web browser, and transmitted via a network 44 like the internet or a retail store provided network to the customer profile database 34. The customer profile database 34 may also store a history of the customer's purchases and shopping pattern data associated with each customer for processing data analytics by the retail store management system 30.

Alternatively, a customer 42 may interact with a customer NFC device 50, (further described below), that may include the customer interface 40 thereon to generate a customer profile in the same manner. For example, the customer NFC device 50 may be a smartphone that has a web browser customer interface 40 or a specific retail store executable application customer interface 40 to generate and communicate a customer profile to the customer profile database 34.

Contents of the customer profile may include, for example, but not be limited to: consumable food ingredients that a customer may be allergic to; non-consumable materials that customer may be allergic to; types of consumable food ingredients and/or types of non-consumable materials that a customer may not wish to purchase; a diet that a customer is adhering to that may include predetermined discouraged types of food and/or ingredients, predetermined encouraged types of food and/or ingredients, and predetermined discouraged and/or encouraged nutritional values of for food products; medically prohibited types of food and/or ingredients, medically encouraged types of food and/or ingredients, and medically prohibited and/or encouraged nutritional values of for food products; and, date limits on the date of processing/manufacturing related to the expiration or relative freshness of certain consumable food products.

A customer 42 may generate their customer profile with any degree of detail and then store the profile in the customer profile database 34 via the customer interface 40. The customer 42 may later edit their customer profile via the customer interface 40 to delete, add or change any information as the customer's health or dietary concerns change.

Figure 2:
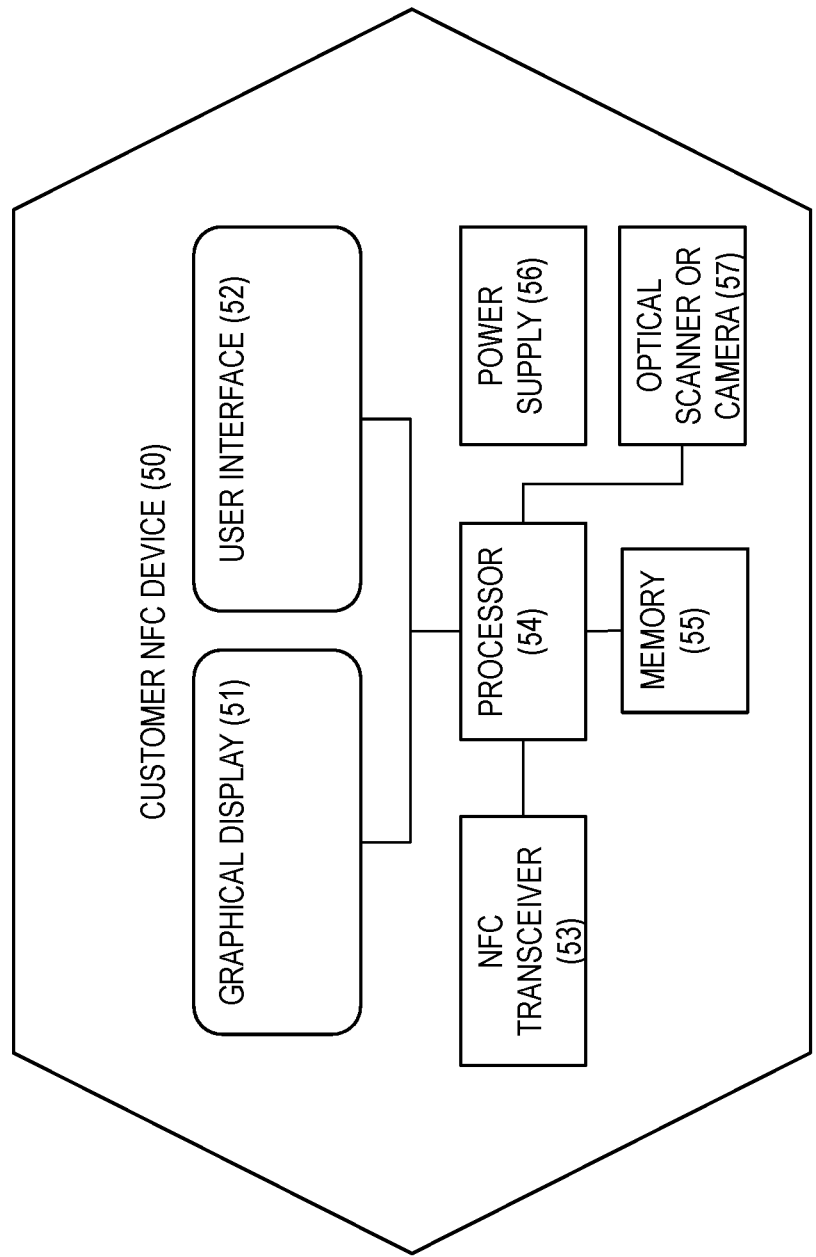
FIG. 2 illustrates a schematic diagram of components of a customer's NFC device.

FIG. 2 illustrates a schematic diagram of components of a customer NFC device 50. A customer NFC device 50 may include a graphical display 51, a user interface 52 for interacting with the ESL management system 70, (wherein in some embodiments, the user interface 52 and the graphical display 51 may comprise a single touch-screen user interface), an NFC transceiver 53 for communication with an ESL management system 70, a POS device 80 and any other NFC-type device and a processor 54 in communication with all the components in addition to a memory 55 configured to store processor instructions and data. The customer NFC device 50 additionally includes a power supply 56 to power all necessary components on the customer NFC device 50.

The customer NFC device 50 may additionally include an optical line scanner and/or 2-D camera imaging device 57 in communication with the processor 54 for scanning barcodes or imaging glyph graphics on products in a retail store without an ESL management system 70 to allow the customer NFC device 50 to scan or image the product and wirelessly connect to a database where SKU attributes 12 may be compared to data in a customer profile to generate notifications for output on the customer NFC device 50.

A customer NFC device 50 may have at least two purposes: first, to identify the customer with their associated customer profile to the ESL management system 70; and second, to interact with the ESL management system 70 in the process of generating a shopping list while the customer shops for products in the retail store.

Figure 3:
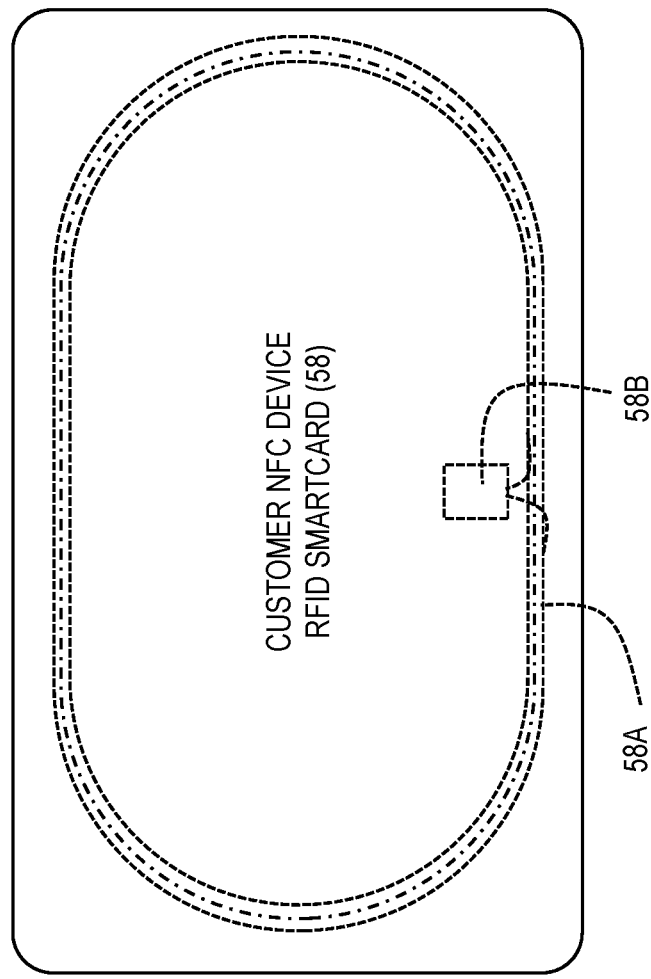
FIG. 3 illustrates a schematic diagram of components of a customer's NFC device comprising a RFID smart card.

The NFC device 50 may be a mobile smart phone device with an NFC transceiver, a mobile personal shopping device with an NFC transceiver issued by the retail store for the benefit of the customer's in-store shopping, or an RFID smart card (disclosed in more detail in FIG. 3). In each of the above alternatives, the NFC device 50 wirelessly communicates with the ESL management system 70, and in particular, with each of the ESL devices 72-76 associated with the respective products of the retail store. Any type of NFC communication protocol and hardware may be used between the NFC device 50 and the ESL devices 72-76 within the ESL management system 70. The NFC device 50 may also be configured to scan barcodes with a line scanner or scan QR-codes or glyph data with a 2-D laser scanner, optical scanner or digital camera 57.

FIG. 3 illustrates an alternative customer NFC device, similar to the customer NFC device 50 of FIG. 2, but comprising an RFID "smart card" configuration 58 using a unique identifier for an individual shopper. The customer NFC RFID smart card device 58 may be distributed as a store-specific member RFID card or a store-specific non-member RFID card. The customer NFC RFID smart card device 58 may additionally be configured as a prepaid, debit or credit RFID card.

The customer NFC RFID smart card device 58 may include a coiled communication and power antenna 58A electrically connected with an RFID microchip processor 58B that contains a unique electronic identifier that may be associated with a particular customer.

The RFID smart card device 58 may be a contactless credential whose dimensions are credit-card size. Its embedded integrated circuits 58B can store (and sometimes process) data and communicate with a terminal via NFC. Contactless smart cards may contain read-only RFID called CSN (Card Serial Number) or UID, and a re-writeable smart card microchip that can be transcribed via radio waves. The RFID smart card device 58 may be a sized to an ID-1 of ISO/IEC 7810 standard which defines it as 85.60×53.98× 0.76 mm (3.370×2.125×0.030 in).

The RFID smart card device 58 may contain a security system with tamper-resistant properties (e.g. a secure crypto-processor, secure file system, human-readable features) and may be capable of providing security services (e.g. confidentiality of information in the memory).

Smart card data is transferred via radio waves to the ESL management system 70 through card read-write devices, such as individual ESLs (e.g., 72), point of sales devices, doorway access control readers, ticket readers, ATMs, USB-connected desktop readers, etc.

The RFID smart card device 58 is a contactless smart card in which RFID microchip processor 58B communicates with a card reader through an induction technology at data rates of 106 to 848 kbit/s. These cards require only close proximity to an antenna of the ESL 72 to initiate communication. The standard for contactless smart card communications is ISO/IEC 14443. It defines two types of contactless cards ("A" and "B") and allows for communications at distances up to 10 cm (3.9 in).

Like smart cards with contacts, contactless cards do not have a battery. Instead, they use a built-in inductor antenna 58A, using the principle of resonant inductive coupling, to capture some of the incident electromagnetic signal, rectify it, and use it to power the card's electronics.

Figure 4:
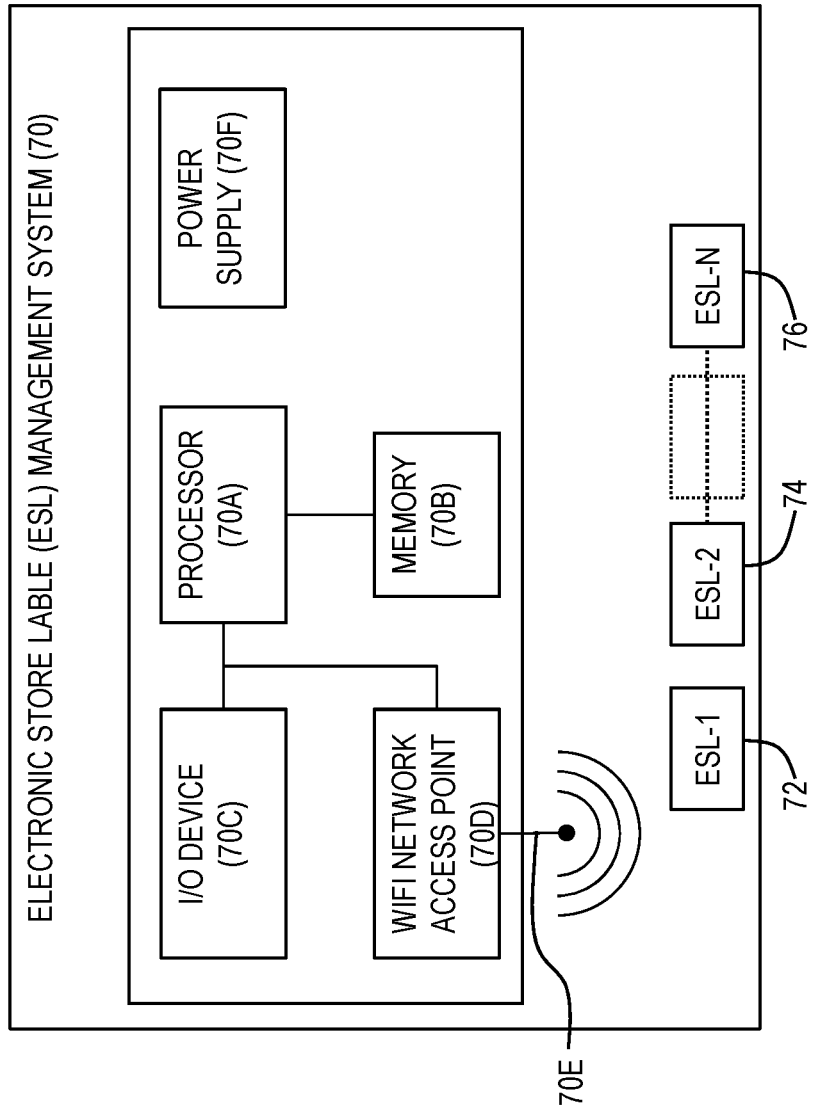
FIG. 4 illustrates a schematic diagram of component of an ESL management system.

FIG. 4 illustrates a schematic diagram of components of a representative ESL management system 70 that may include a processor 70A in communication with the following elements: a memory 70B capable of storing executable instructions and data for the processor 70A; an Input/output (I/O) device 70C capable of receiving and transmitting information from the product information database 32 and the customer profile database 34; and a WIFI network access point 70D capable of communicating via an antenna 70E between each ESL device (e.g., ESL-1 72 to ESL-N 76) in the ESL management system 70. Additionally, a power supply 70F may provide power to necessary components of the ESL management system 70.

Figure 5:
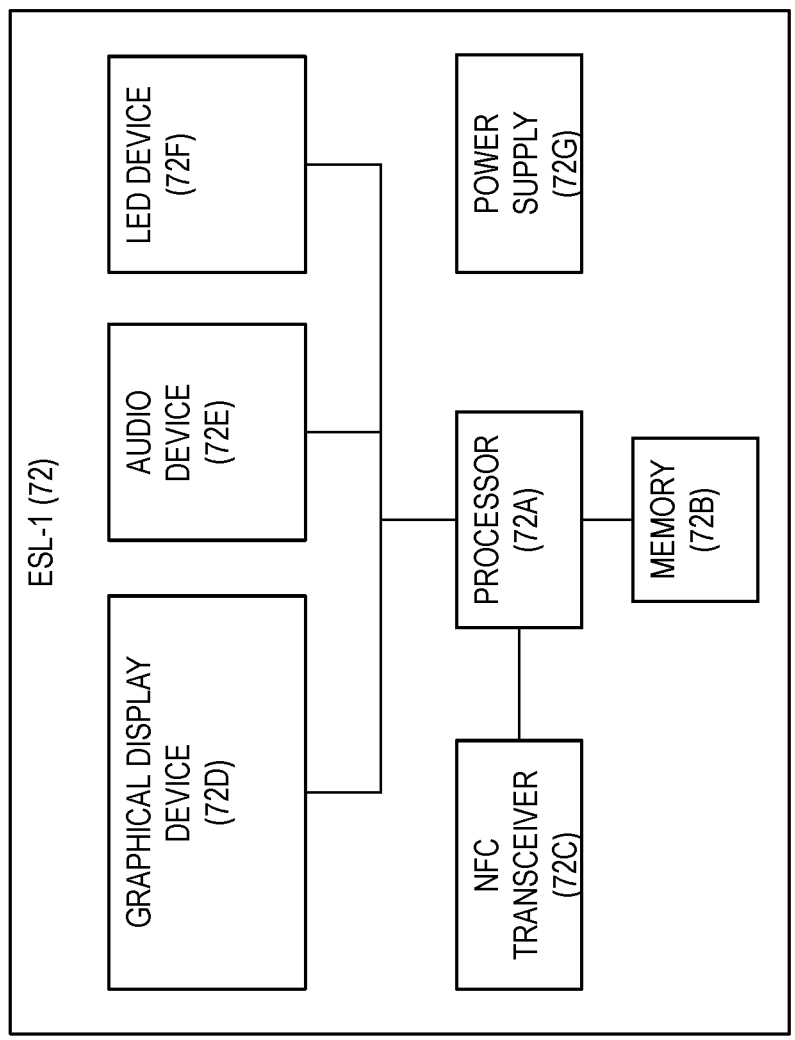
FIG. 5 illustrates a schematic diagram of components of an ESL used within the ESL management system of FIG. 3.

FIG. 5 illustrates a schematic diagram of components of a representative ESL-1 72 used within an ESL management system 70. For example, ESL-1 72 may include a processor 72A in communication with the following components: a memory 72B configured to store processor executable instructions and data; an NFC transceiver 72C for communication with the ESL management system 70 and any customer NFC device 50; a display screen 72D for displaying item information that may include SKU, price and barcode information; an audio device 72E; and a Light Emitting Diode (LED) device 72F. Additionally, a power supply 72G may provide on-board or mains-supplied power to any component of the ESL-1 72 requiring a power supply.

Continuing the discussion of FIG. 1, when a customer 42 desires to generate a shopping list of items in a retail store environment 60 with an ESL management system 70, the customer 42 take the customer NFC device 50 and moves it with a NFC communication range to an ESL associated with an item that the customer intends to purchase. The ESL management system 70 via the corresponding ESL device recognizes the customer NFC device 50 and retrieves from the retail store management system 30, a corresponding customer profile from the customer profile database 34 and the SKU attributes 12 for the item associated with the customer selected ESL device. A comparison is made between information in the customer profile against all the items in the SKU attributes 12. If no matching data is found, the ESL management system 70 communicates the item SKU information and item price to a POS device or system 80 to thereby generate a shopping list 82 including the item designated by the customer's NFC device 50 at the ESL.

The customer 42 may then continue to add additional items to the shopping list 82 in the same manner by moving their customer NFC device 50 with NFC communication range of another respective ESL. Normally, customers 42 may place the items designated by their customer NFC devices 50 into a physical shopping cart and then proceed to the POS device 80 to finalize a transaction payment. However, in the alternative, certain retail stores may collect the items from a storage location inaccessible by the customer so designated by the customer's NFC device 50 for collection to be either pick-up by the customer at a later time or be delivered to customer specified location after finalizing a transaction payment for the items in the shopping list 82.

For example, a customer 42 with a customer NFC device 50 moves the customer NFC device into a position P1 that is within NFC range with the ESL-1 72 to select an item to be added to their shopping list 82. The ESL management system 70 recognizes the customer NFC device 50 at position P1, and, if no matching information is found between information in the customer profile and information in the SKU attributes 12 from the product information database 32, the ESL management system 70 communicates the item price and SKU information to the POS device 80 which adds the price and SKU information to the shopping list 82.

The customer 42 may continue browsing the retail store environment looking at another item associated with ESL-2 74 but not choosing to move the customer NFC device 50 within NFC range such that an item associated with ESL-2 74 is not added to the shopping list 82 at the POS device 80.

In another example, the customer 42 with the customer NFC device 50 moves the customer NFC device into a position P2 that is within NFC range with ESL-N 76 to select an item associated with ESL-N 76. In a similar manner describe above, the ESL management system 70 recognizes the customer NFC device 50 at position P2 and retrieves the customer profile corresponding to the customer NFC device 50, (or accesses the previously retrieved customer profile now stored in the memory 70B of the ESL management system 70), and the SKU attributes 12 corresponding to the item associated with ESL-N from the product information database 32. If a match is found between information in the SKU attributes 12 and the customer profile, then the ESL management system 70 sends a notification to the customer to indicate that either an ingredient, a material composition or a nutrition value of the item that the customer 42 intends to add to the shopping list needs further consideration by the customer before adding it to the shopping list.

The notification provided by the ESL management system 70 may take place in various forms and at various locations. The ESL device itself (72-76) may provide notification to the customer 42 by flashing a colored, (e.g., red), LED device 72F, by producing an audible tone on an audio device 72E, and/or by displaying a message on the graphical display device 72D. Additionally, the customer NFC device 50 may also receive the notification from the ESL management system 70 via the NFC transceiver 72C and provide haptic feedback through a vibration device, produce an audible tone on a speaker, and/or display a message on a graphical display device.

Once the notification has been presented to the customer, the customer may choose not to add item to the shopping list 82 and do nothing else. If the customer desires to override the notification sent by the ESL management system 70, the customer 42 may move the customer NFC device 50 again within NFC range of the ESL-N 76 again and the ESL management system 70 communicates the item price and SKU information to the POS device 80 to adds the price and SKU information to the shopping list 82.

Once the customer 42 has completed shopping in the retail store environment 60, the customer 42 take the customer NFC device 50 within NFC range of the POS device 80 to authorize a financial transaction to purchase the items on the shopping list 82.

Figure 6:
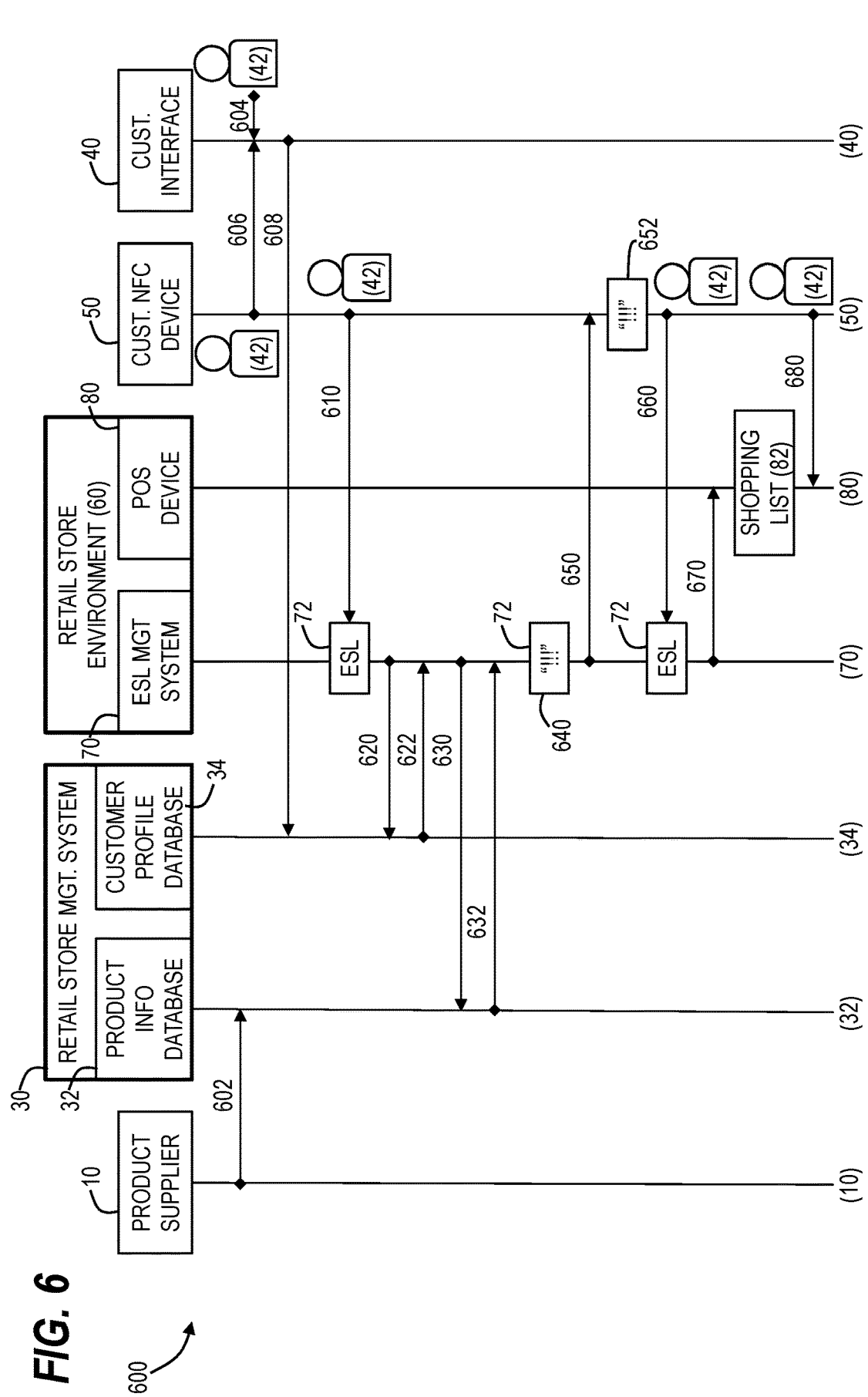
FIG. 6 illustrates a communication state diagram between elements disclosed in FIG. 1 with the customer's NFC device 50 of FIG. 2.

FIG. 6 illustrates a communication state diagram 600 between elements of the system disclosed in FIG. 1. In step 602, a product supplier 10 communicates SKU attributes 12 for each SKU item offered for sale in the retail store environment 60 to the product information database 32 of the retail store management system 30. In step 604, a customer 42 may build a customer profile by either operating directly on a customer interface 40, or in the alternative step 606, the customer 42 may operate a customer NFC device 50 to build the customer profile containing the customer interface 40. The customer interface 40 at step 608 then communicates the customer profile to the customer profile database 34 in the retail store management system 30. The customer interface 40 may be a smartphone, tablet or computer having an input device sufficient to collect the customer profile information and transmit it to the customer profile database 34.

A customer profile may include a single ingredient or multiple consumable food ingredients that a customer may be allergic to. The customer interface 40 may provide for a customer to select a general consumable food type, e.g., milk products, if the customer is allergic to lactose, wherein the customer interface 40 may automatically select a group of dairy products that contain lactose rather than cause the customer 42 to manually choose every product that contains the ingredient.

A customer profile may further include non-consumable materials that customer may be have an allergic contact reaction to, for example, wool or latex containing items.

A customer profile may further include types of consumable food ingredients and/or types of non-consumable materials that a customer may not wish to purchase for dietary, moral or religious preferences. The customer interface 40 may provide for a customer 42 to select a general dietary or product preferences, e.g., a kosher, vegetarian or vegan preference. The customer interface 40 may then automatically populate the customer profile with restricted consumable foods, restricted non-consumable products or products that comply with a customer chosen diet or preference.

A customer profile may further include medically prohibited or encouraged types of food and/or ingredients, and medically prohibited and/or encouraged nutritional values of for food products. For example, the customer interface 40 may provide for a customer to select medical restrictions on food ingredients or foods having a certain nutrition value. Likewise, the customer interface may provide for a customer to select medically encouraged food ingredients or foods having a certain nutrition value or range of values.

A customer profile may further include time values regarding the date of processing/manufacturing related to the expiration or relative freshness of consumable food products. For example, the customer interface 40 may provide for a customer 42 to indicate that all dairy or meat products be no more than a customer-specified number of days from the product's expiration date.

After the SKU attributes 12 and customer profile has been stored in the retail store management system 30 at the product information database 32 and customer profile database 34, respectively, step 610 illustrates a customer 42 bringing their customer NFC device 50 within NFC communication range of an ESL 72. Thereafter, the ESL management system 70, in communication with the ESL 72, communicates with the customer NFC device 50 to identify the customer for retrieving that customer's profile. The ESL management system 70 in step 620 then requests the customer profile from the customer profile database 34, wherein the customer profile in step 622 is sent to the ESL management system 70. The ESL management system 70 in step 630 further communicates with the product information database 32 to cause the SKU attributes 12 of the item associated with the ESL 72 to be transmitted in step 632 to the ESL management system 70.

The ESL management system 70 at step 640 then compares the customer profile information to match any ingredients, material composition or nutrition information values of the SKU attributes 12, and if a match exists, the ESL management system 70 transmits a notification, (represented by "!!!") to the ESL 72 to attract the attention of the customer. As described above, the notification may be an audible signal, an LED emission, and/or a graphical display on the ESL 72. In the alternative, the ESL 72 may at step 650 send the notification via NFC to the customer NFC device 50 so that, at step 652, there may be a presentation of haptic, audio and/or a graphical display notification to the customer 42.

In an alternative embodiment, the notification generated by the ESL management system 70 may also notify a customer of nutritional value or ingredient of an item that the customer profile intends to encourage. For example, a customer on a low-sodium diet may have a notification sent by the ESL management system 70 when a customer activates an ESL for a product having nutrition information from the product information database 32 below a certain sodium-per-serving value. Another example may be when a customer's profile includes a fiber content-per-serving value and a product has nutrition information at or above that per-serving value. In this alternative embodiment, the ESL management system 70 may notify the customer in a similar manner as explained above, and not require a secondary activation by the customer with the customer NFC device, but rather add the item at the first instance to the shopping list 82. Notifications of this "positive" type may also be distinguished from "prohibitory" notifications described above by emitting a different audible tone, a different colored LED light, or a graphical display on either the ESL 72 and/or the customer NFC device 50.

As describe above, the customer 42 after the notification may continue shopping by adding other items to the shopping list 82 or may check out at the POS device 80. However, if the customer 42 intends to override the notification generation by the ESL management system 70, the customer 42 in step 660 brings the customer NFC device 50 within NFC communication range of the ESL 72 to confirm that the customer intends to add the item that generated the notification to the shopping list 82 on the POS device 80. In so doing, the ESL management system 70 in step 670 adds the item to the shopping list 82.

After the customer 42 had completed the shopping list 82, the customer at step 680 brings the customer NFC device 50 within NFC range of the POS device 80 to initiate a financial transaction for the items on the shopping list 82.

Figure 7:
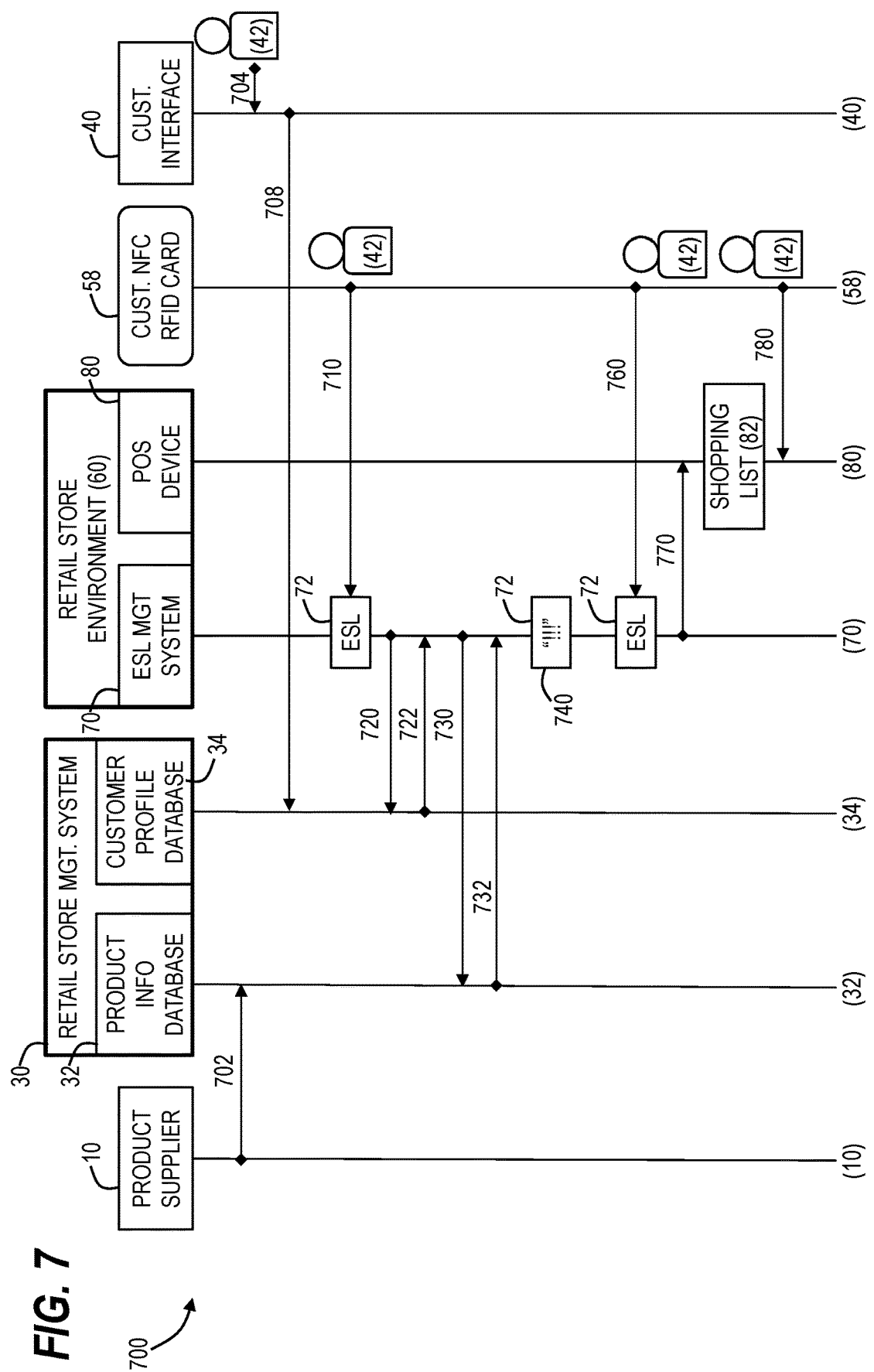
FIG. 7 illustrates an alternate communication state diagram between elements disclosed in FIG. 1 with the customer's NFC RFID smart card device 58 of FIG. 3.

FIG. 7 illustrates an alternate communication state diagram 700 between elements of the system disclosed in FIG. 1 with the customer NFC RFID "smart card" device 58 as illustrated in FIG. 3. In step 702, a product supplier 10 communicates SKU attributes 12 for each SKU item offered for sale in the retail store environment 60 to the product information database 32 of the retail store management system 30. In step 704, a customer 42 may build a customer profile by operating a customer interface 40 to build the customer profile. The customer interface 40 at step 708 then communicates the customer profile to the customer profile database 34 in the retail store management system 30. The customer interface 40 may be a smartphone, tablet or computer having an input device sufficient to collect the customer profile information and transmit it to the customer profile database 34.

After the SKU attributes 12 and customer profile has been stored in the retail store management system 30 at the product information database 32 and customer profile database 34, respectively, step 710 illustrates a customer 42 bringing their customer NFC RFID smart card device 58 within NFC communication range of an ESL 72. Thereafter, the ESL management system 70, in communication with the ESL 72, communicates with the customer NFC RFID smart card device 58 to identify the customer for retrieving that customer's profile. The ESL management system 70 in step 720 then requests the customer profile from the customer profile database 34, wherein the customer profile in step 722 is sent to the ESL management system 70. The ESL management system 70 in step 730 further communicates with the product information database 32 to cause the SKU attributes 12 of the item associated with the ESL 72 to be transmitted in step 732 to the ESL management system 70.

The ESL management system 70 at step 740 then compares the customer profile information to match any ingredients, material composition or nutrition information values of the SKU attributes 12, and if a match exists, the ESL management system 70 transmits a notification to be graphically displayed and/or an audio notice to be played, (represented by "!!!") to the ESL 72 to attract the attention of the customer. As described above, the notification may be an audible signal, an LED emission, and/or a graphical display on the ESL 72.

In an alternative embodiment, the notification generated by the ESL management system 70 may also notify a customer of nutritional value or ingredient of an item that the customer profile intends to encourage. For example, a customer on a low-sodium diet may have a notification sent by the ESL management system 70 when a customer activates an ESL for a product having nutrition information from the product information database 32 below a certain sodium-per-serving value. Another example may be when a customer's profile includes a fiber content-per-serving value and a product has nutrition information at or above that per-serving value. In this alternative embodiment, the ESL management system 70 may notify the customer in a similar manner as explained above, and not require a secondary activation by the customer with the customer NFC device, but rather add the item at the first instance to the shopping list 82. Notifications of this "positive" type may also be distinguished from "prohibitory" notifications described above by emitting a different audible tone, a different colored LED light, or a graphical display on either the ESL 72 and/or the customer NFC RFID smart card device 58.

As describe above, the customer 42 after the notification may continue shopping by adding other items to the shopping list 82 or may check out at the POS device 80. However, if the customer 42 intends to override the notification generation by the ESL management system 70, the customer 42 in step 760 brings the customer NFC RFID smart card device 58 within NFC communication range of the ESL 72 to confirm that the customer intends to add the item that generated the notification to the shopping list 82 on the POS device 80. In so doing, the ESL management system 70 in step 770 adds the item to the shopping list 82.

After the customer 42 had completed the shopping list 82, the customer at step 780 brings the customer NFC RFID smart card device 58 within NFC range of the POS device 80 to initiate a financial transaction for the items on the shopping list 82.

Figure 8:
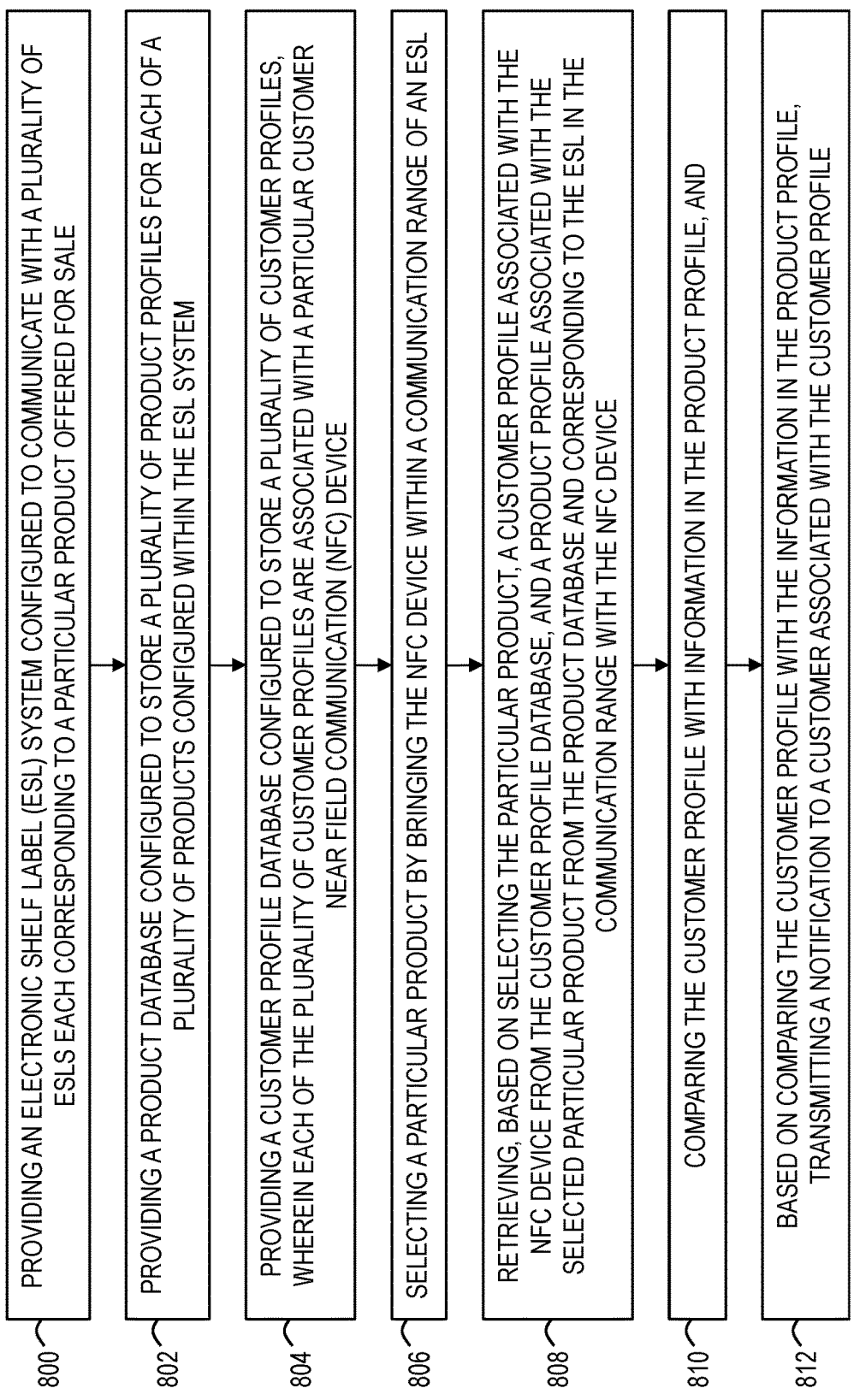
FIG. 8 illustrates a schematic diagram of a method of providing notification to a customer about a product that the customer intends to include on an electronic shopping list via interaction between a customer's NFC device and a retail store's ESL system.

FIG. 8 illustrates a schematic diagram of a method of providing notification to a customer about a product that the customer intends to include on an electronic shopping list via interaction between a customer's NFC device and a retail store's ESL system.

The method provides notification to a customer about a product offered for sale, where the method particularly includes providing 800 an ESL system 70 configured to communicate with a plurality of ESLs (e.g., 72, 74, 76) each corresponding to a product offered for sale, providing 802 a product database 32 configured to store a plurality of product profiles for each of a plurality of products configured within the ESL system 70, providing 804 a customer profile database 34 configured to store a plurality of customer profiles, wherein each of the plurality of customer profiles are associated with a customer NFC device 50 (or RFID smart card device 58), selecting 806 a product by bringing the NFC device 50 or RFID device 58 within a communication range of an ESL (e.g., 72), retrieving 808, based on selecting the product, a customer profile associated with the NFC device 50 from the customer profile database 34 and a product profile associated with the selected product from the product database 32 corresponding to the ESL in the communication range with the NFC device 50, comparing 810 the customer profile with information in the product profile, and based on comparing the customer profile with the information in the product profile, transmitting 812 a notification to a customer associated with the customer profile.

The method of transmitting the notification to the customer associated with the customer profile further includes transmitting the notification to an NFC transceiver of the ESL and causing one of an audible alert on an audio device of the ESL, a visible emitted light on an LED device of the ESL, or a graphical notification on a graphical display of the ESL.

The method of transmitting the notification to the customer associated with the customer profile further includes transmitting the notification to an NFC transceiver of the NFC device, and causing a graphical notification on a graphical display of the NFC device.

The method further includes providing that each of the plurality of customer profiles include information containing at least one of a customer consumption ingredient allergy, a customer contact composition allergy, or a customer nutrition target value.

The method further includes providing that each of plurality of product profiles include information containing at least one of a product ingredients list, product composition information, or product nutrition information.

The method further includes providing that the notification includes information containing at least one of a customer consumption ingredient allergy, a customer contact composition allergy, or a customer nutrition target value.

While the forms of the apparatus, system and methods described herein constitute a preferred embodiment of the invention, the present invention is not limited to the precise forms described herein, and changes may be made therein without departing from the scope of the invention defined by the appended claims.

What is claimed is:

1. A system comprising:
   an Electronic Shelf Label (ESL) system configured to communicate with a plurality of ESLs each corresponding to a product offered for sale;
   a Near Field Communication (NFC) device configured to communicate with each of the plurality of ESLs within a predetermined distance from the ESL;
   a customer profile database disposed remote from the NFC device configured to store a plurality of customer profiles, wherein each of the plurality of customer profiles are associated with a customer NFC device; and
   a product database configured to store a plurality of product profiles for each of a plurality of products configured within the ESL system,
   wherein the NFC device is configured to communicate with one of the plurality of ESLs corresponding to a product offered for sale of the plurality of products when brought within the predetermined distance from the ESL,
   wherein the ESL system retrieves
      a customer profile associated with the NFC device from the customer profile database, and
      a product profile associated with the product offered for sale from the product database and corresponding to an ESL in communication with the NFC device, and
   wherein the ESL system is configured to compare the customer profile with information in the product profile and configured to transmit a notification to a customer associated with the customer profile when information in the customer profile matches any information in the product profile.

2. The system according to claim 1, wherein each of the plurality of ESLs comprise:
   a graphical display;
   at least one of an audio device or a Light Emitting Diode (LED) device; and
   an NFC transceiver configured to communicate with the NFC device,
   wherein the notification is configured to cause one of an audible alert on the audio device, a visible emitted light on the LED device or a graphical notification on the graphical display.

3. The system according to claim 1, wherein the NFC device comprises:
   a graphical display;
   a user interface; and
   a NFC transceiver configured to communicate with the plurality of ESLs of the ESL system,
   wherein the notification is configured to be received by the NFC transceiver and cause a graphical notification on the graphical display.

4. The system according to claim 1, wherein the NFC device comprises:
   a contactless communication-type RFID smart card,
   wherein the notification is configured to be received by the ESL and cause at least one of a graphical notification, an audible notification or a light emitting notification on the ESL.

5. The system according to claim 1, wherein each of the plurality of customer profiles comprise information containing at least one of:
   a customer allergy consumption ingredient;
   a customer allergy contact composition; or
   a customer nutrition target value.

6. The system according to claim 1, wherein each of the plurality of product profiles comprises information containing at least one of:
- a product ingredients list;
- product composition information; or
- product nutrition information.

7. The system according to claim 1, wherein the notification further comprises information about at least one of a customer consumption ingredient allergy, a customer contact composition allergy, or a customer nutrition target value.

8. The system according to claim 7, wherein the notification further comprises a notification message configured to be transmitted to a graphical display on at least one of
- the ESL associated with the product offered for sale and in communication with the NFC device, or
- the NFC device in communication with the ESL associated with the product offered for sale.

9. A system comprising:
- an Electronic Shelf Label (ESL) system configured to communicate with a plurality of ESLs each corresponding to a product offered for sale;
- a Near Field Communication (NFC) device configured to communicate with each of the plurality of ESLs within a predetermined distance from the ESL;
- a customer profile database disposed remote from the NFC device and configured to store a plurality of customer profiles, wherein each of the plurality of customer profiles are associated with a customer NFC device;
- a product database configured to store a plurality of product profiles for each of a plurality of products configured within the ESL system; and
- a Point of Sale (POS) device in communication with the ESL system configured to generate a shopping list of at least one product based on the NFC device interacting with at least one ESL of the plurality of ESLs,
- wherein the NFC device is configured to communicate with one of the plurality of ESLs corresponding to a product offered for sale of the plurality of products when brought within the predetermined distance from the ESL,
- wherein the ESL system retrieves
  - a customer profile associated with the NFC device from the customer profile database, and
  - a product profile associated with the product offered for sale from the product database and corresponding to an ESL in communication with the NFC device,
- wherein the ESL system is configured to compare the customer profile with information in the product profile and configured to transmit a notification to a customer associated with the customer profile when information in the customer profile matches any information in the product profile, and
- wherein the NFC device is configured to select a product associated with an ESL, and in response, the ELS system is configured to generate an electronic shopping list containing the product on the POS device.

10. The system according to claim 9, wherein each of the plurality of ESLs comprise:
- a graphical display;
- at least one of an audio device or a Light Emitting Diode (LED) device; and
- an NFC transceiver configured to communicate with the NFC device,
- wherein the notification is configured to cause one of an audible alert on the audio device, a visible emitted light on the LED device or a graphical notification on the graphical display.

11. The system according to claim 9, wherein the NFC device comprises:
- a graphical display;
- a user interface; and
- a NFC transceiver configured to communicate with the plurality of ESLs of the ESL system,
- wherein the notification is configured to be received by the NFC transceiver and cause a graphical notification on the graphical display.

12. The system according to claim 9, wherein the NFC device comprises:
- a contactless communication-type RFID smart card,
- wherein the notification is configured to be received by the ESL and cause one of a graphical notification, an audible notification or a light emitting notification on the ESL.

13. The system according to claim 9, wherein each of the plurality of customer profiles comprise information containing at least one of:
- a customer allergy consumption ingredient;
- a customer allergy contact composition; or
- a customer nutrition target value.

14. The system according to claim 9, wherein each of the plurality of product profiles comprises information containing at least one of:
- a product ingredients list;
- product composition information; or
- product nutrition information.

15. The system according to claim 9, wherein the notification further comprises information about at least one of a customer consumption ingredient allergy, a customer contact composition allergy, or a customer nutrition target value.

16. The system according to claim 15, wherein the notification further comprises a notification message configured to be transmitted to a graphical display on at least one of
- the ESL associated with the product offered for sale and in communication with the NFC device, or
- the NFC device in communication with the ESL associated with the product offered for sale.

17. A method of providing notification to a customer about a product offered for sale, the method comprising:
- providing an Electronic Shelf Label (ESL) system configured to communicate with a plurality of ESLs each corresponding to a product offered for sale;
- providing a product database configured to store a plurality of product profiles for each of a plurality of products configured within the ESL system,
- providing a customer profile database configured to store a plurality of customer profiles, wherein each of the plurality of customer profiles are associated with a customer Near Field Communication (NFC) device, wherein the customer profile database is disposed remote from the NFC device;
- selecting a product by bringing the NFC device within a communication range of an ESL;
- retrieving, based on selecting the product, a customer profile associated with the NFC device from the customer profile database and a product profile associated with the selected product from the product database corresponding to the ESL in the communication range with the NFC device;
- comparing the customer profile with information in the product profile; and based on comparing the customer profile with the information in the product profile, transmitting a notification to a customer associated with the customer profile.

18. The method according to claim 17, wherein transmitting the notification to the customer associated with the customer profile further comprises:
   transmitting the notification to an NFC transceiver of the ESL; and
   causing one of
      an audible alert on an audio device of the ESL,
      a visible emitted light on an LED device of the ESL, or
      a graphical notification on a graphical display of the ESL.

19. The method according to claim 17, wherein transmitting the notification to the customer associated with the customer profile further comprises:
   transmitting the notification to an NFC transceiver of the NFC device; and
   causing a graphical notification on a graphical display of the NFC device.

20. The method according to claim 17, wherein each of the plurality of customer profiles comprise information containing at least one of:
   a customer allergy consumption ingredient;
   a customer allergy contact composition; or
   a customer nutrition target value.

21. The method according to claim 17, wherein each of plurality of product profiles comprises information containing at least one of:
   a product ingredients list;
   product composition information; or
   product nutrition information.

22. The method according to claim 17, wherein the notification further comprises information containing at least one of
   a customer allergy consumption ingredient,
   a customer allergy contact composition, or
   a customer nutrition target value.

* * * * *